(12) United States Patent
Lee et al.

(10) Patent No.: US 12,003,997 B2
(45) Date of Patent: Jun. 4, 2024

(54) GATEWAY-BASED SITUATION MONITORING SYSTEM

(71) Applicant: NURION Co., Ltd., Ansan-si (KR)

(72) Inventors: Sang Woo Lee, Seoul (KR); Jeong Myung Lee, Gunpo-si (KR)

(73) Assignee: NURION CO., LTD., Ansan-si (KR)

( * ) Notice: Subject to any disclaimer, the term of this patent is extended or adjusted under 35 U.S.C. 154(b) by 312 days.

(21) Appl. No.: 17/556,034

(22) Filed: Dec. 20, 2021

(65) Prior Publication Data

US 2022/0286886 A1  Sep. 8, 2022

(30) Foreign Application Priority Data

Mar. 3, 2021 (KR) .................. 10-2021-0028191

(51) Int. Cl.
*H04W 24/10* (2009.01)
*H04L 43/0817* (2022.01)
*H04W 4/38* (2018.01)
*H04W 24/04* (2009.01)
*H04W 88/16* (2009.01)

(52) U.S. Cl.
CPC ......... *H04W 24/10* (2013.01); *H04L 43/0817* (2013.01); *H04W 4/38* (2018.02); *H04W 24/04* (2013.01); *H04W 88/16* (2013.01)

(58) Field of Classification Search
CPC ....... H04W 4/38; H04W 84/18; H04W 88/16; H04W 4/02; H04W 24/10; H04W 12/08; H04W 12/02; H04W 4/33; H04W 12/00; H04W 64/00; H04W 24/08; H04W 12/102; H04W 24/00; H04W 40/20; H04W 36/32; H04W 76/38
See application file for complete search history.

(56) References Cited

U.S. PATENT DOCUMENTS

| 2013/0100268 A1* | 4/2013 | Mihailidis | G08B 21/02 348/77 |
| 2019/0320945 A1* | 10/2019 | Johnson | G16H 80/00 |
| 2023/0000396 A1* | 1/2023 | Coffey | A61B 5/1117 |

FOREIGN PATENT DOCUMENTS

KR  10-2009-0080672 A  7/2009

* cited by examiner

*Primary Examiner* — Kwasi Karikari
(74) *Attorney, Agent, or Firm* — Paratus Law Group, PLLC

(57) ABSTRACT

A gateway-based situation monitoring system, includes: a plurality of edge sensor terminals each installed in a specific place, connected according to at least one wireless communication scheme, and collecting life signals generated in the specific place as monitoring information; a gateway terminal selectively connected to the plurality of edge sensor terminals according to the at least one wireless communication scheme, receiving the life signal, and transmitting the received life signal to a cloud server; and a cloud server detecting the occurrence of an abnormal situation while monitoring the specific space by analyzing the life signal received from the gateway terminal.

5 Claims, 6 Drawing Sheets

GATEWAY-BASED SITUATION MONITORING SYSTEM

CROSS-REFERENCE TO PRIOR APPLICATION

This application claims priority to Korean Patent Application No. 10-2021-0028191 (filed on Mar. 3, 2021), which is hereby incorporated by reference in its entirety.

BACKGROUND

The present disclosure relates to a situation monitoring scheme and more particularly, a gateway-based situation monitoring system capable of effectively observing an emergency situation occurring within a household using non-contact, non-aware, and non-constrained IoT sensors.

In general, the aging society refers to a society in which the proportion of the population aged 65 and over is 7% or more of the total population, the aged society refers to a society in which the proportion is 14% or more, and the post-aged society or superaged society refers to a society in which the proportion is 20% or more.

In Korea, although the enforcement decree of the employment promotion act for the elderly stipulates that those aged 55 and over are the elderly and those aged 50 to 54 are semi-aged (Article 2), the United Nations considers a society to be an aging society when the proportion of the population aged 65 and over is 7% or more of the total population.

In addition, due to the recent increase of single-person households along with this trend of aging, the number of lonely deaths, which describes people dying alone and remaining undiscovered for a long time after death, is increasing. Accordingly, each local government is trying to prevent lonely death by having social workers or volunteers periodically visit older people living alone or check their health by phone calls.

However, the above approach has a problem in that the status of older people living alone may not be checked in real-time due to limited resources of people, and it is difficult to respond quickly when an emergency occurs.

Recently, therefore, research efforts are being conducted on developing an information and communication technology-based monitoring system that uses monitoring devices installed in the house of an older person living alone and automatically contacts a guardian or an emergency center in case of an emergency.

PRIOR ART

[Patent] Korea laid-open patent no. 10-2009-0080672 (2009.07.27)

SUMMARY

One embodiment of the present disclosure attempts to provide a gateway-based situation monitoring system that may effectively observe an emergency situation occurring within a household using non-contact, non-aware, and non-constrained IoT sensors.

One embodiment of the present disclosure attempts to provide a gateway-based situation monitoring system that may support building an open smart home ecosystem by securing interoperability with various products and services through a gateway implementing various wireless communication functions.

According to the embodiments, a gateway-based situation monitoring system may comprise a plurality of edge sensor terminals each installed in a specific place, connected according to at least one wireless communication scheme, and collecting life signals generated in the specific place as monitoring information; a gateway terminal selectively connected to the plurality of edge sensor terminals according to the at least one wireless communication scheme, receiving the life signal, and transmitting the received life signal to a cloud server; and a cloud server detecting the occurrence of an abnormal situation while monitoring the specific space by analyzing the life signal received from the gateway terminal, wherein the occurrence of the abnormal situation is predicted probabilistically through a pre-built prediction model—the prediction model is constructed by learning a life signal pattern generated by classifying the life signal for each edge sensor terminal.

The plurality of edge sensor terminals may include a fire detector, a gas circuit breaker, a thermal image detector, a door detector, an activity detector, a bio-signal detector, an emergency pager, and an AI speaker; use WiFi, Bluetooth, and Zigbee respectively for the at least one wireless communication scheme; and be grouped according to their wireless communication scheme employed.

The gateway terminal may allow each group formed according to the grouping to independently occupy communication due to the at least one wireless communication scheme and in the occurrence of an overlapping channel between the groups, selectively connect wireless communication schemes related to the corresponding overlapped channel.

The gateway terminal may dynamically determine the priority and connection time of a selective connection for each of the corresponding wireless communication schemes according to the size, the average amount of data, and the average transmission period of a group related to each of the corresponding wireless communication schemes related to the corresponding overlapping channel.

When the occurrence of the abnormal situation is detected, the cloud server may provide notification about the corresponding abnormal situation to a pre-assigned manager or a guardian and provide a control signal about propagation and responding measures of the corresponding abnormal situation to the gateway terminal.

The cloud server uses the hidden Markov model (HMM) as the prediction model and constructs the prediction model by adding a combination pattern between at least one bio-signal included in the life signal and at least one environmental signal to the life signal pattern, wherein the combination pattern may correspond to an independent hidden layer and be added to the hidden Markov model.

The present disclosure may provide the following effects. However, since it is not meant that a specific embodiment has to provide all of or only the following effects, the technical scope of the present disclosure should not be regarded as being limited by the specific embodiment.

A gateway-based situation monitoring system according to one embodiment of the present disclosure may effectively observe an emergency situation occurring within a household using non-contact, non-aware, and non-constrained IoT sensors.

A gateway-based situation monitoring system according to one embodiment of the present disclosure may support building an open smart home ecosystem by securing interoperability with various products and services through a gateway implementing various wireless communication functions.

DETAILED DESCRIPTION

Figure 1:
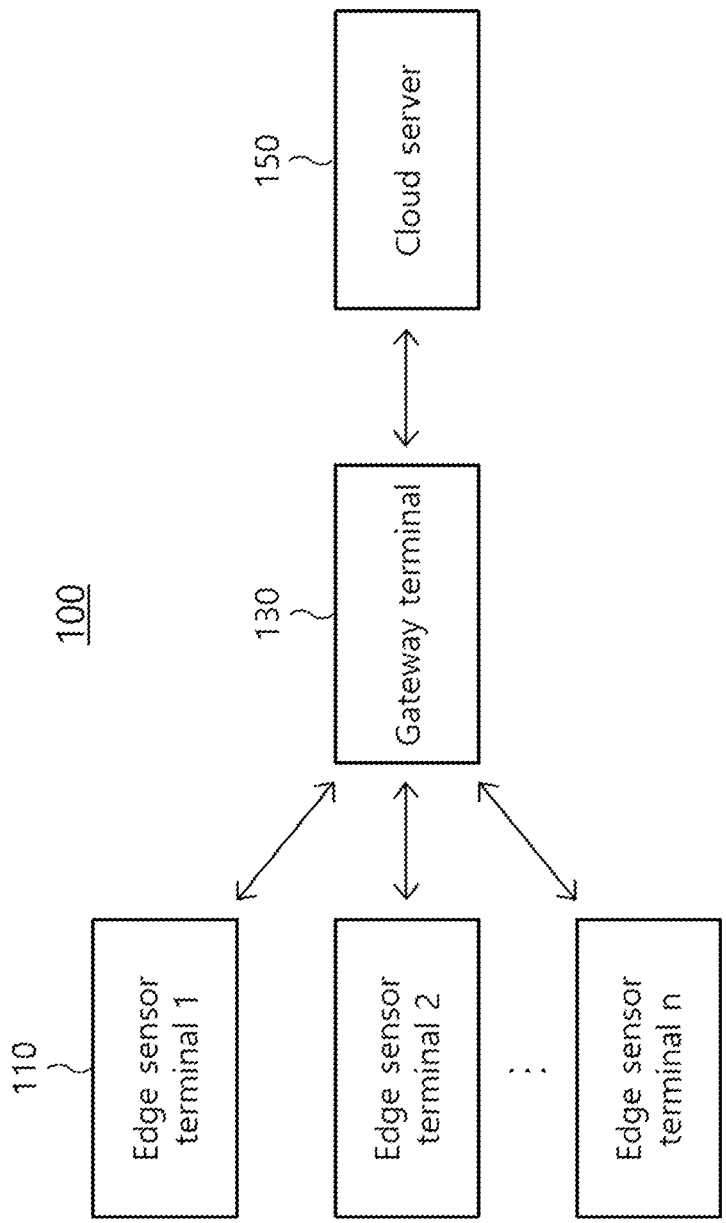
FIG. 1 illustrates a situation monitoring system according to the present disclosure.

Since the description of the present disclosure is merely an embodiment for illustrating structural or functional description, it should not be interpreted that the technical scope of the present disclosure is limited by the embodiments described in this document. In other words, embodiments may be modified in various ways and implemented in various forms; therefore, it should be understood that various equivalents realizing technical principles of the present disclosure belong to the technical scope of the present disclosure. Also, since it is not meant that a specific embodiment should support all of the purposes or effects intended by the present disclosure or include only the purposes or effects, the technical scope of the present disclosure should not be regarded as being limited to the descriptions of the embodiment.

Meanwhile, implication of the terms used in the present disclosure should be understood as follows.

The terms such as "first" and "second" are introduced to distinguish one element from the others, and thus the technical scope of the present disclosure should not be limited by those terms. For example, a first element may be called a second element, and similarly, the second element may be called the first element.

Suppose a constituting element is said to be "connected" to another constituting element. In that case, the former may be connected to the latter element directly, but it should be understood that a third constituting element may be present between the two elements. On the other hand, if a constituting element is said to be "directly connected" to another constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term "include" or "have" is used to indicate the existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices that store data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 illustrates a situation monitoring system according to the present, disclosure.

Referring to FIG. 1, the situation monitoring system 100 may include an edge sensor terminal 110, a gateway terminal 130, and a cloud server 150.

The edge sensor terminal 110 may be installed in a specific place to measure information (for example, a life signal) related to life reactions in the corresponding place. To this end, the edge sensor terminal 110 may be basically implemented to include at least one sensor but is not necessarily limited thereto. In addition, the edge sensor terminal 110 may be implemented by including a wireless biometric sensor and collect precise biometric information using a broadband frequency. The edge sensor terminal 110 may be operated with low power, may be miniaturized, and may provide high-resolution measurements. The edge sensor terminal 110 may be connected to the gateway terminal 130 through a network and communicate directly with the cloud server 150. However, the present disclosure basically assumes that the edge sensor terminal 110 is connected to the gateway terminal 130.

The gateway terminal 130 may receive a life signal measured from a plurality of edge sensor terminals 110 and transmit the measured signal to the cloud server 150. The gateway terminal 130 may be located between the edge sensor terminal 110 and the cloud server 150 to relay data transfer between the two. It is basically assumed that the gateway terminal 130 is implemented as a single device. However, the present disclosure is not limited to the assumption, and the gateway terminal 130 may be composed of a plurality of independent gateway terminals if necessary. In this case, the gateway terminal 130 may operate in cooperation with each other.

The cloud server 150 may be implemented as a server corresponding to a computer or a program that detects whether an emergency has occurred to a person (for example, an older person or a patient) present in a specific place by analyzing bio-signals collected from the specific place, propagates the emergency to the outside, and remotely controls emergency relief measures. In other words, the cloud server 150 may analyze collected information and generate information such as apnea, cardiac arrest, respiration, falling, sleep quality, fire outbreak, or well-being detection and amount of activity as an analysis result, through which a 24 hours always-on monitoring function may be provided.

Also, the cloud server 150 may be connected to the gateway terminal 130 through a wired or wireless network and may transmit and receive data to and from the gateway terminal 130 through, for example, Ethernet. Meanwhile, the cloud server 150 may operate in conjunction with an external system. For example, the cloud server 150 may be connected to a hospital, emergency service 119, and police needed for emergency relief and may be connected to a public system such as a community center to provide related information.

Figure 2:
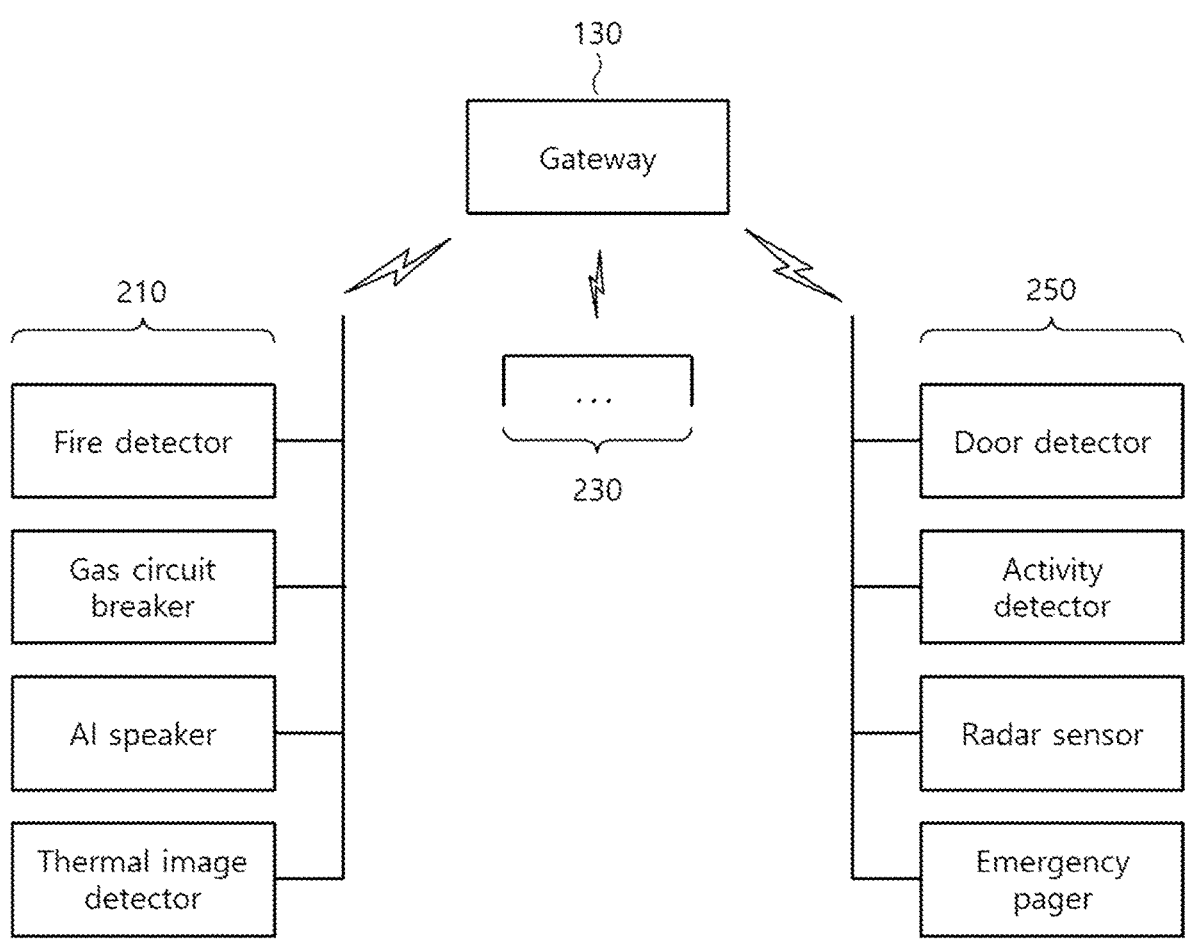
FIG. 2 illustrates edge sensor terminals according to one embodiment of the present disclosure.

FIG. 2 illustrates edge sensor terminals according to one embodiment of the present disclosure.

Referring to FIG. 2, the edge sensor terminal 110 may be connected to the gateway terminal 130 to transmit various life signals measured by individual terminals. The edge sensor terminal 110 may be implemented to include at least one sensor to perform an independent function and may be implemented to have a built-in computational capability. For example, the edge sensor terminal 110 may include a fire detector, a gas circuit breaker, an AI speaker, a thermal image detector, a door detector, an activity detector, an emergency pager, and a radar sensor. Each terminal may be installed in one space (for example, a house) to collect internal situation information from multiple aspects.

More specifically, the fire detector may correspond to a device capable of detecting and notifying the occurrence of fire. The gas circuit breaker may include a switching device that automatically shuts off the gas when a gas leak is detected. The AI speaker includes an AI function that may communicate directly with people. The thermal image detector may measure the body temperature of a person present inside the place, and the thermal imaging camera may capture an image using thermal radiation for identifying people's body temperature.

In addition, the door detector may be installed on a door to detect the door's motion. The activity detector may detect movement within the space in which the activity detector is installed and generate a detection signal related to the motion. The radar sensor may perform the operation of detecting an object based on a radar signal and, in the case of a person, may measure a signal related to respiration or heartbeat. The emergency pager may generate an emergency signal when the emergency button is pressed.

Meanwhile, each edge sensor terminal 110 may be connected to the gateway terminal 130 using an independent wireless communication scheme. For example, the fire detector, the gas circuit breaker, the AI speaker, and the thermal imaging camera may be connected to the gateway terminal 130 through Wi-Fi. The door detector, the activity detector, the emergency pager, and the radar sensor may be connected to the gateway terminal 130 through Zigbee.

Therefore, the gateway terminal 130 according to the present disclosure may be implemented to perform communication through various wireless communication schemes with various edge sensor terminals 110. For example, the gateway terminal 130 may be implemented to include a function supporting all of Wi-Fi, Bluetooth, and Zigbee communication and, depending on the needs, may apply a wireless communication scheme selectively.

In one embodiment, the plurality of edge sensor terminals 110 may be grouped and managed according to their wireless communication scheme employed. For example, a Wi-Fi group 210 may include the fire detector, the gas circuit breaker, the AI speaker, and the thermal image detector. A Zigbee group 250 may include the door detector, the activity detector, the emergency pager, and the radar sensor. A Bluetooth group 230 may include the edge sensor terminals 110 using Bluetooth communication.

Meanwhile, the gateway terminal 130 may search for the edge sensor terminals 110 in the surroundings and check their interconnection state through a periodic scan operation for the respective wireless communication schemes. To this purpose, the gateway terminal 130 may group and manage the edge sensor terminals 110 according to their wireless communication scheme employed.

Figure 3:
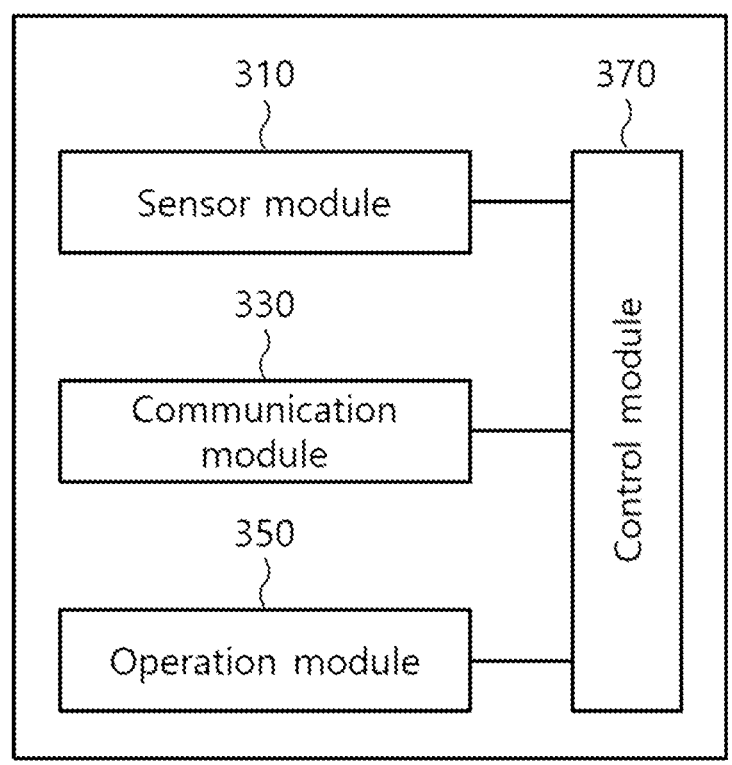
FIG. 3 illustrates a functional structure of the edge sensor terminal of FIG. 1.

FIG. 3 illustrates a functional structure of the edge sensor terminal of FIG. 1.

Referring to FIG. 3, the edge sensor terminal 110 may include a sensor module 310, a communication module 330, an operation module 350, and a control module 370.

The sensor module 310 may be implemented by including at least one sensor. The sensor module 310 may be constructed using a sensor relevant to a function to be provided and perform the role of collecting sensing signals in real-time or periodically by controlling the operation of the sensor.

The communication module 330 may connect the edge sensor terminal 110 to the gateway terminal 130 or the cloud server 150 through a network. The communication module 330 may be implemented to provide a communication function according to a wireless communication scheme used by the corresponding edge sensor terminal 110.

The operation module 350 may correspond to a computation unit for performing an independent function of the edge sensor terminal 110. In other words, the control module 370 serves to supervise interworking and control of the constituting elements of the edge sensor terminal 110. In contrast, the operation module 350 may perform the role of processing an independent function that the edge sensor terminal 110 attempts to provide. The information generated by the operation module 350 may be transmitted to the control module 370 and may be stored and managed in the internal storage space.

The control module 370 may control the overall operation of the edge sensor terminal 110 and manage a control flow or a data flow between the sensor module 310, the communication module 330, and the operation module 350.

Figure 4:
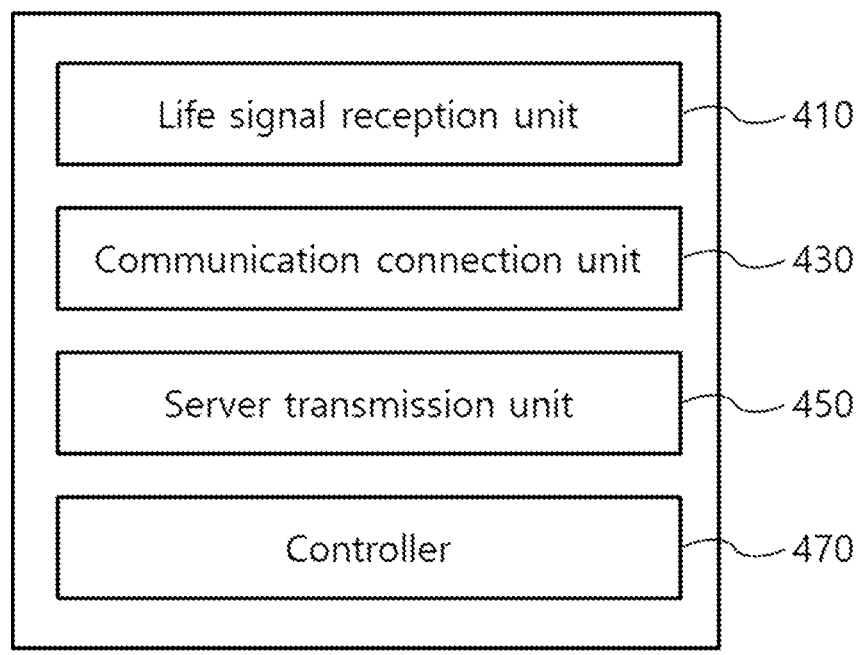
FIG. 4 illustrates a functional structure of the gateway terminal of FIG. 1.

FIG. 4 illustrates a functional structure of the gateway terminal of FIG. 1.

Referring to FIG. 4, the gateway terminal 130 may include a life signal reception unit 410, a communication connection unit 430, a server transmission unit 450, and a controller 470.

The life signal reception unit 410 may receive a life signal as sensing information from a plurality of edge sensor terminals 110. The life signal reception unit 410 may perform a pre-processing operation on the received life signal and process the life signal into a form relevant to subsequent operations. The life signal reception unit 410 may store and maintain the received and processed life signals, respectively. The life signal reception unit 410 may classify and store life signals according to the respective edge sensor terminals 110 and perform operations such as filtering, sampling, normalization, or standardization depending on the needs.

The communication connection unit 430 may provide wireless communication by activating a communication function according to the wireless communication scheme of the edge sensor terminal 110 to be connected in conjunction with the life signal reception unit 410. The communication connection unit 430 may selectively use various wireless communication schemes for communication with various edge sensor terminals 110 and use a plurality of wireless communication schemes sequentially or simultaneously. In addition, the communication connection unit 430 may apply an independent connection policy to minimize interference between different wireless communication schemes that use a plurality of wireless communication schemes simultaneously.

In one embodiment, the communication connection unit 430 may independently allow at least one wireless communication scheme to occupy communication for each group generated due to grouping the edge sensor terminals 110. In this case, wireless communication schemes related to the overlapping channel may be selectively connected when there is channel overlap between groups.

More specifically, the communication connection unit 430 may allow the corresponding edge sensor terminals 110 to occupy the Wi-Fi communication channel for connection to the Wi-Fi group. The Wi-Fi communication channel may be composed of 13 channels in units of 5 MHz blocks, and the communication connection unit 430 may allow occupation of at least one of the corresponding channels for communication with the Wi-Fi group. The edge sensor terminals 110 communicating using the Wi-Fi communication scheme may transmit data to the gateway terminal 110 through a corresponding channel.

If there is channel overlap between different communication groups, the communication connection unit 430 may provide a communication connection for each group in parallel by allocating different channels to the respective groups. Through this operation, the gateway terminal 130 may minimize channel interference between various edge sensor terminals 110 and efficiently process data transmission and reception.

In one embodiment, the communication connection unit 430 may dynamically determine the priority and connection time of a selective connection for each of the wireless communication schemes according to the size, the average amount of data, and the average transmission period of a group related to each of the wireless communication schemes related to the overlapping channel. The type and number of connectable edge sensor terminals 110 may vary according to the structure, use, and characteristics of the space in which the gateway terminal 130 is installed.

Accordingly, while managing channel occupation for the overlapping channel through the communication connection unit 430, the gateway terminal 130 may dynamically determine the priority of each wireless communication scheme according to the size of each group (that is, the number of edge sensor terminals belonging to the group) and the average amount of data and the average transmission period of each group. And the gateway terminal 130 may sequentially employ each wireless communication scheme according to the corresponding priority. Here, each group's average amount of data may correspond to the average of the amount of data transfer of the edge sensor terminals 110 belonging to the group.

Also, the communication connection unit 430 may limit the connection time for each wireless communication scheme considering each group's average amount of data and average transmission period. In other words, the communication connection unit 430 may minimize interference between wireless communication schemes by connecting the wireless communication schemes according to their priority and connecting the wireless communication scheme of the next priority when a limited connection time elapses.

The server transmission unit 450 may transmit a received life signal to the cloud server 150. The gateway terminal 130 may be connected to the cloud server 150 through Ethernet, and the server transmission unit 450 may transmit the life signal to the cloud server 150 through the Ethernet communication scheme. In one embodiment, the server transmission unit 450 may transmit the life signal to the cloud server 150 in a wireless communication scheme. In this case, the life signal may be transmitted after being encrypted.

The controller 470 may control the overall operation of the gateway terminal 130 and manage a control flow or a data flow among the life signal reception unit 410, the communication connection unit 430, and the server transmission unit 450.

Figure 5:
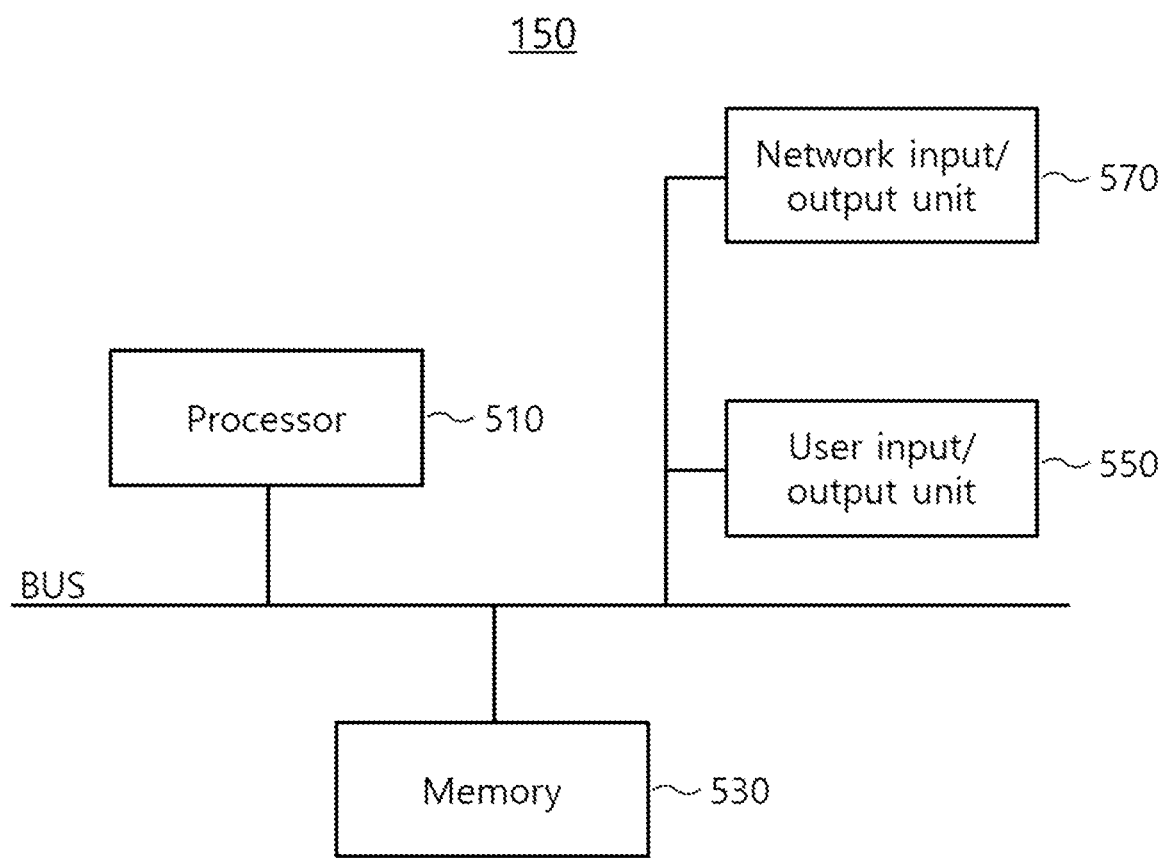
FIG. 5 illustrates the system structure of the cloud server of FIG. 1.

FIG. 5 illustrates the system structure of the cloud server of FIG. 1.

Referring to FIG. 5, the cloud server 150 may be implemented by including a processor 510, a memory 530, a user input/output unit 550, and a network input/output unit 570.

The processor 510 may execute a procedure for processing each step of the process in which the cloud server 150 operates, manage the memory 530 read or written throughout the process, and schedule the synchronization timing between the volatile and non-volatile memory in the memory 530. The processor 510 may control the overall operation of the cloud server 150 and may be electrically connected to the memory 530, the user input/output unit 550, and the network input/output unit 570 to control data flow between them. The processor 510 may be implemented as a central processing unit (CPU) of the cloud server 150.

The memory 530 is implemented using a non-volatile memory such as a solid state drive (SSD) or a hard disk drive (HDD) and may include an auxiliary storage device used to store all of the data required for the cloud server 150. The memory 530 may include a main memory implemented using a volatile memory such as Random Access Memory (RAM).

The user input/output unit 550 may include an environment for receiving a user input and an environment for outputting specific information to the user. For example, the user input/output unit 550 may include an input device with an adapter such as a touchpad, a touch screen, an on-screen keyboard, or a pointing device; and an output device with an adapter such as a monitor or a touch screen. In one embodiment, the user input/output unit 550 may correspond to a computing device accessed through a remote connection and may form a server-client relationship with the cloud server 150.

The network input/output unit 570 may include an environment for connecting to an external device or a system through a network and may have an adaptor for communication through, for example, a local area network (LAN), a metropolitan area network (MAN), a wide area network (WAN), and a value added network (VAN).

The cloud server 150 according to the present disclosure may analyze life signals received from the gateway terminal 130 and detect the occurrence of an abnormal situation while monitoring a specific space.

In one embodiment, when an abnormal situation is detected, the cloud server 150 may provide notification about the abnormal situation to a pre-assigned manager or a guardian. In addition, the cloud server 150 may provide a control signal related to the propagation and responding measures of the corresponding abnormal situation to the gateway terminal 130. The gateway terminal 130 may provide specific information through the edge sensor terminal 110 according to the control signal or promptly convey related content.

For example, the cloud server 150 may propagate the situation by sending an emergency text message to a pre-assigned manager or a guardian. The cloud server 150 may transmit a control signal to the gateway terminal 130 to make an AI speaker connected to the gateway terminal 130 try to talk to other people present in the corresponding place. In addition, the gateway terminal 130 may prevent a secondary accident by controlling the operation of a gas circuit breaker according to a control signal generated when a fire sensor of a fire detector senses fire or operates. The gateway terminal 130 may support an emergency evacuation situation by controlling the door opening function of a door lock interworking with a door detector according to the control signal generated when the fire sensor senses fire or operates.

In one embodiment, the cloud server 150 may use a hidden Markov model (HMM) as a prediction model and construct the prediction model by adding a combination pattern between at least one bio-signal included in a life signal and at least one environmental signal to a life signal pattern. At this time, the combination pattern may correspond to an independent hidden layer and be added to the hidden Markov model.

Here, the hidden Markov model (HMM) may correspond to a model based on the Markov chain, and the Markov chain may model a discrete-time stochastic process described by the Markov property.

The cloud server 150 may construct a prediction model by applying learning data about the life signal pattern to the hidden Markov model. In this case, the life signal pattern may include a pattern exhibiting the interaction between a user and an object. In this case, the corresponding pattern may be generated by a combination of bio-signals collected from the user through biosensors and environmental signals collected from the object through IoT sensors. For example, the life signal pattern may include a pattern generated by a combination of a bio-signal related to a user's body temperature collected through a thermal image detector and an environmental signal related to a movement collected through an activity detector.

As a result, the Hidden Markov model may be constructed by including, as learning data, various patterns related to combinations of bio-signals and environmental signals generated in the process of interaction between a user and an object. Meanwhile, the hidden Markov model may be constructed using a plurality of hidden layers and may include independent hidden layers corresponding to bio-signals and environmental signals, respectively. The hidden Markov model may be implemented so that the corresponding hidden layers are sequentially connected or cross-connected by reflecting the interaction between the bio-signal and the environmental signal. In addition, the hidden Markov model may be constructed including an independent hidden layer corresponding to a combination between a bio-signal and an environmental signal.

As another example, the cloud server 150 may construct a hidden Markov model corresponding to each of the bio-signal and the environmental signal and construct an integrated hidden Markov model (namely, a connected hidden Markov model or a coupled hidden Markov model) through a connection between the respective hidden Markov models due to the interaction between them. In this case, the connection between the hidden Markov models may be implemented through the connection between specific hidden layers.

Figure 6:
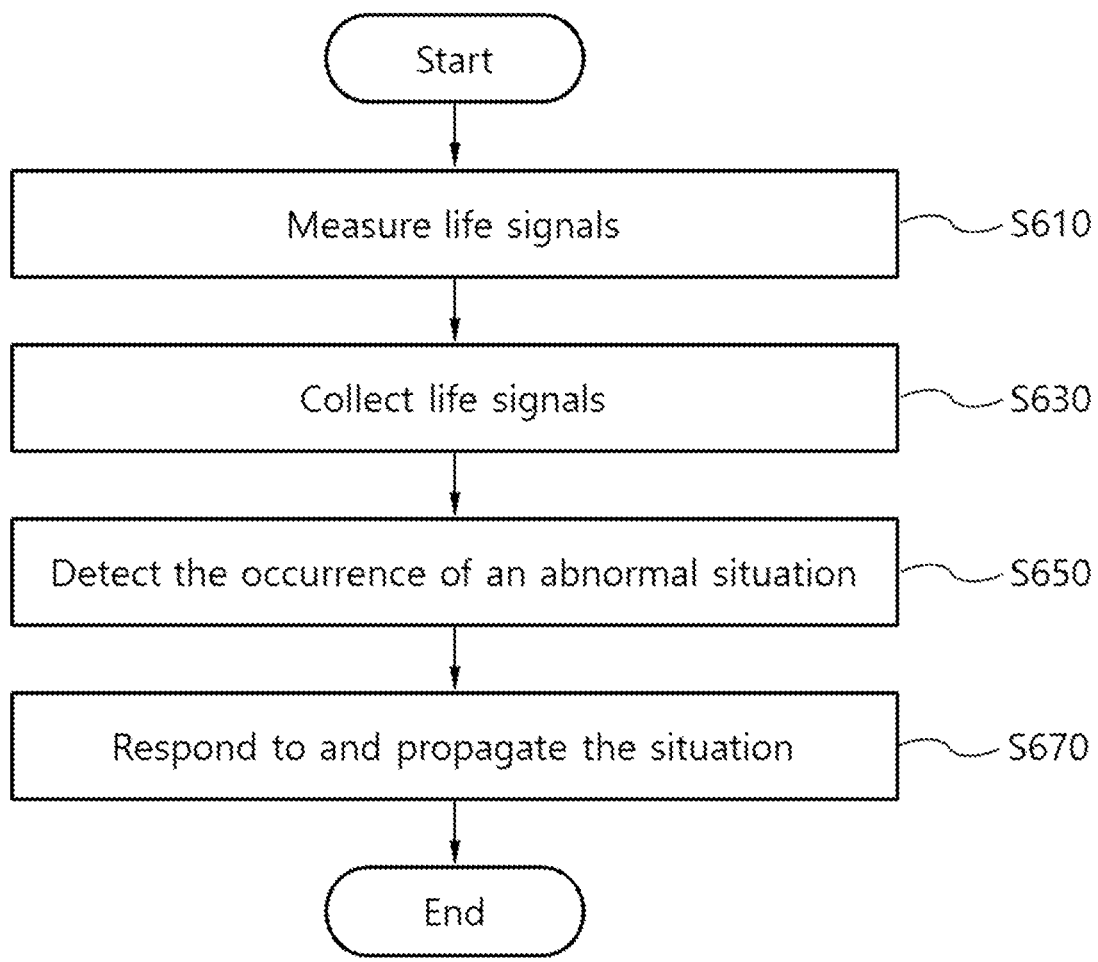
FIG. 6 is a flow diagram illustrating a gateway-based situation monitoring method according to the present disclosure.

FIG. 6 is a flow diagram illustrating a gateway-based situation monitoring method according to the present disclosure.

Referring to FIG. 6, the situation monitoring system 100 may collect life signals from a plurality of edge sensor terminals 110 installed in a specific place 5630. In other words, each of the plurality of edge sensor terminals 110 may independently measure a life signal 5610. The gateway terminal 130 may be connected to the plurality of edge sensor terminals 110 to receive a life signal through wireless communication and transmit the received life signal to the cloud server 150.

Afterward, the situation monitoring system 100 may perform monitoring of the specific space by analyzing life signals through the cloud server 150. At this time, the cloud server 150 may detect the occurrence of an abnormal situation by referring to the analysis result of the life signal 5650.

When the occurrence of an abnormal situation is detected, the cloud server 150 may quickly propagate the situation and perform an operation for responding to the situation 5670. For example, the cloud server 150 may transmit notification about the abnormal situation to a pre-assigned manager or a guardian in the form of a text message and support responding measures of the abnormal situation to be promptly executed by propagating the situation to an external system such as a pre-designated relief organization or control center.

The situation monitoring system 100 according to the present disclosure may construct an integrated monitoring system comprising sensors, a gateway, and a cloud server to monitor the occurrence of an abnormal situation from various angles and promptly respond to the abnormal situation and prevent a secondary accident through the propagation of the situation and the control system comprising the cloud server, the gateway, and the sensors.

Although the present disclosure has been described with reference to preferred embodiments given above, it should be understood by those skilled in the art that various modifications and variations of the present disclosure may be made without departing from the technical principles and scope specified by the appended claims below.

[Description of Reference Characters]

| | |
|---|---|
| 100: Situation monitoring system | |
| 110: Edge sensor terminal | 130: Gateway terminal |
| 150: Cloud server | |
| 210: WiFi communication group | 230: Bluetooth communication group |
| 250: Zigbee communication group | |
| 310: Sensor module | 330: Communication module |
| 350: Operation module | 370: Control module |
| 410: Life signal reception unit | 430: Communication connection unit |
| 450: Server transmission unit | 470: Controller |
| 510: Processor | 530: Memory |
| 550: User input/output unit | 570: Network input/output unit |

What is claimed is:

1. A gateway-based situation monitoring system, the system comprising:

a plurality of edge sensor terminals each installed in a specific place, connected according to a plurality of wireless communication schemes, and configured to collect life signals generated in the specific place as monitoring information;

a gateway terminal selectively connected to the plurality of edge sensor terminals according to the plurality of wireless communication schemes, and configured to receive the life signal and transmit the received life signal to a cloud server; and the cloud server configured to detect an occurrence of an abnormal situation while monitoring the specific place by analyzing the life signal received from the gateway terminal, wherein the occurrence of the abnormal situation is predicted probabilistically through a pre-built prediction model constructed by learning a life signal pattern generated by classifying the life signal for each edge sensor terminal of the plurality of edge sensor terminals, wherein the gateway terminal is further configured to
group edge sensor terminals of the plurality of edge sensor terminals employing a same wireless communication scheme in a group corresponding to the same wireless communication scheme so that a plurality of groups corresponding to the plurality of wireless communication schemes are generated,
allow the plurality of groups formed according to the grouping to independently occupy communication due to the plurality of wireless communication schemes, and
in an occurrence of an overlapping channel between the plurality of groups, selectively connect wireless communication schemes related to a corresponding overlapped channel by dynamically determining a priority and connection time of a selective connection for each wireless communication scheme of the wireless communication schemes related to the corresponding overlapped channel according to size, average amount of data, or average transmission period of the groups corresponding to the wireless communication schemes related to the corresponding overlapped channel.

2. The system of claim 1, wherein the plurality of edge sensor terminals include a fire detector, a gas circuit breaker, a thermal image detector, a door detector, an activity detector, a bio-signal detector, an emergency pager, and an AI speaker, and the plurality of edge terminals use WiFi, Bluetooth, and Zigbee for the plurality of wireless communication schemes.

3. The system of claim 1, wherein, when the occurrence of the abnormal situation is detected, the cloud server is further configured to
provide notification about a corresponding abnormal situation to a pre-assigned manager or a guardian, and
provide a control signal about propagation and responding measures of the corresponding abnormal situation to the gateway terminal.

4. The system of claim 1, wherein the cloud server is further configured to
use a hidden Markov model (HMM) as the prediction model, and
construct the prediction model by adding a combination pattern between at least one bio-signal included in the life signal and at least one environmental signal to the life signal pattern,
wherein the combination pattern corresponds to an independent hidden layer and is added to the hidden Markov model.

5. The system of claim 1, wherein the gateway terminal is further configured to in the occurrence of the overlapping channel between the plurality of groups, selectively connect wireless communication schemes related to the corresponding overlapped channel by dynamically determining a priority and connection time of the selective connection for each wireless communication scheme of the wireless communication schemes related to the corresponding overlapped channel according to a number of group edge sensor terminals belonging in the groups corresponding to the wireless communication schemes related to the corresponding overlapped channel.

* * * * *